United States Patent
Carroll (12)

(10) Patent No.: US 7,036,401 B2
(45) Date of Patent: May 2, 2006

(54) EXTENDABLE SPLINE-DRIVE SOCKET SYSTEM

(76) Inventor: Sean M. Carroll, 1145 El Camino Real, Burlingame, CA (US) 94010

( * ) Notice: Subject to any disclaimer, the term of this patent is extended or adjusted under 35 U.S.C. 154(b) by 0 days.

(21) Appl. No.: 10/616,484

(22) Filed: Jul. 8, 2003

(65) Prior Publication Data

US 2004/0074344 A1   Apr. 22, 2004

Related U.S. Application Data

(63) Continuation-in-part of application No. PCT/US02/21611, filed on Jul. 8, 2002, which is a continuation-in-part of application No. 29/155,019, filed on Feb. 1, 2002, now Pat. No. Des. 476,873, which is a continuation-in-part of application No. 29/136,362, filed on Jan. 29, 2001, now Pat. No. Des. 459,961, which is a continuation of application No. 09/185,235, filed on Nov. 3, 1998, now abandoned.

(51) Int. Cl.
*B25B 23/16*   (2006.01)
*B25G 1/04*    (2006.01)

(52) U.S. Cl. .................... 81/177.2; 81/124.4; D8/61

(58) Field of Classification Search ............... D8/61, D8/70; 81/177.2, 124.4, 177.85, 459; 279/2.01, 279/9.1, 904
See application file for complete search history.

(56) References Cited

U.S. PATENT DOCUMENTS

| 1,651,361 | A |   | 12/1927 | Ayotte |
| 2,869,410 | A |   | 1/1959 | Prichard |
| 2,951,406 | A |   | 9/1960 | Brase |
| 3,227,015 | A |   | 1/1966 | Tremblay |
| 3,575,069 | A |   | 4/1971 | White |
| 3,654,690 | A |   | 4/1972 | Hardin |
| 4,609,199 | A |   | 9/1986 | Röhm |
| 4,882,958 | A |   | 11/1989 | McNeeley |
| 4,991,472 | A |   | 2/1991 | Hollingsworth |
| 5,148,724 | A |   | 9/1992 | Rexford |
| 5,295,422 | A |   | 3/1994 | Chow |
| 5,365,807 | A |   | 11/1994 | Darrah et al. |
| 5,568,757 | A |   | 10/1996 | Lewis |
| 6,019,019 | A | * | 2/2000 | Hobbs ................. 81/177.2 |
| D459,961  | S | * | 7/2002 | Carroll ................. D8/70 |
| D468,984  | S | * | 1/2003 | Carroll ................. D8/70 |
| D476,873  | S | * | 7/2003 | Carroll ................. D8/70 |

* cited by examiner

*Primary Examiner*—Lee D. Wilson
*Assistant Examiner*—Alvin J. Grant
(74) *Attorney, Agent, or Firm*—GSS Law Group; Carol D. Titus

(57) ABSTRACT

A multi-piece socket system having a large internal cavity to allow a protrusion of a long rod or other workpiece to extend into the socket. The socket section has at least two pieces: a drive adaptor and a socket. Optionally, one or more extension collars may also be used. When assembled, the socket, extension collar(s) if used, and drive adaptor form a long tubular body into which a rod or other central member may enter while the nut is being driven onto the rod. The drive adaptor, extension collars, and sockets preferably attach together using a plurality of interlocking teeth on the ends of each member. For further stability, a spring biased pin extends from the wall of one member and through a hole in the wall of the mating member. Additional attachments, such as a threaded rod and drill chuck, may also be used.

20 Claims, 9 Drawing Sheets

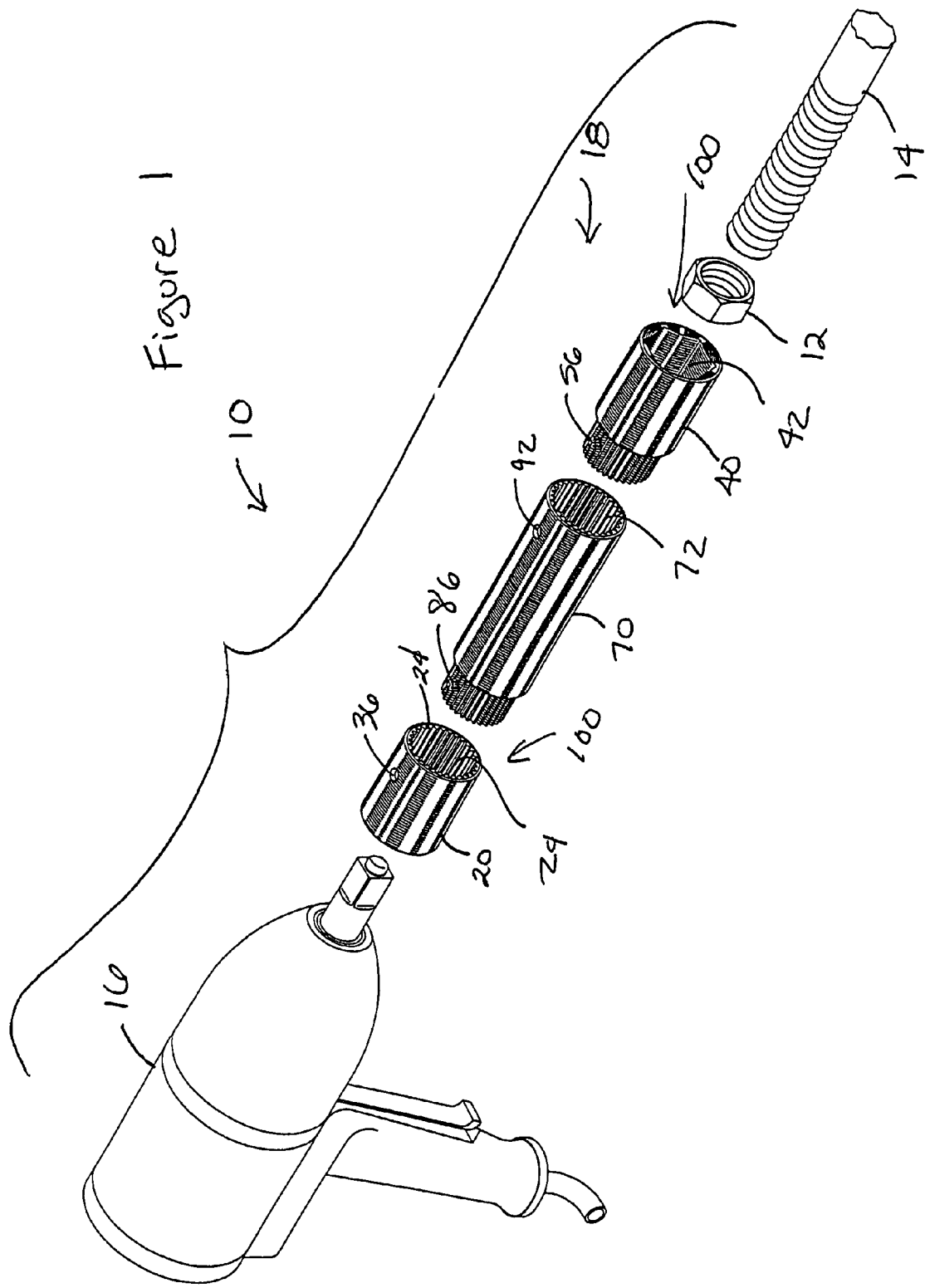

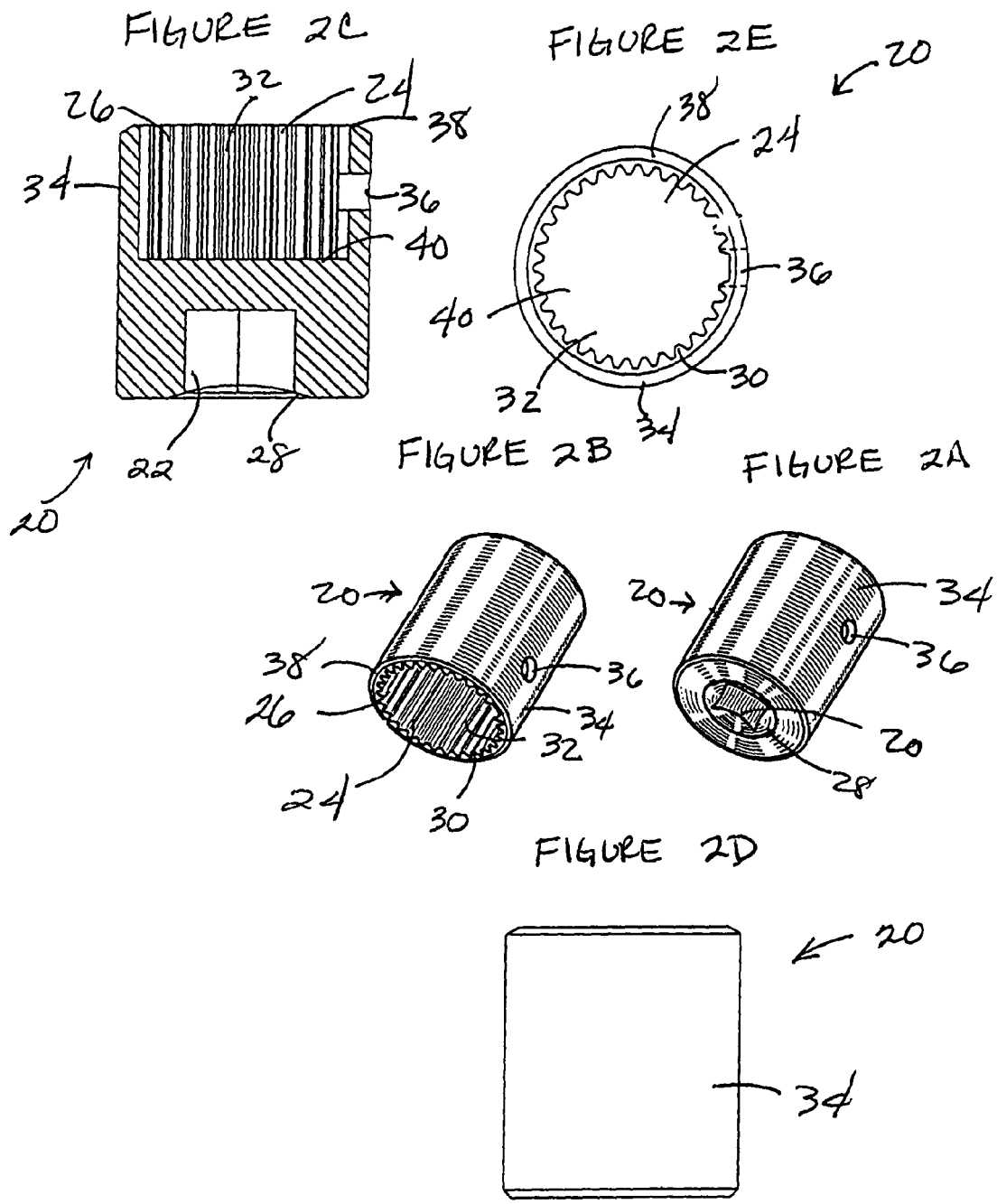

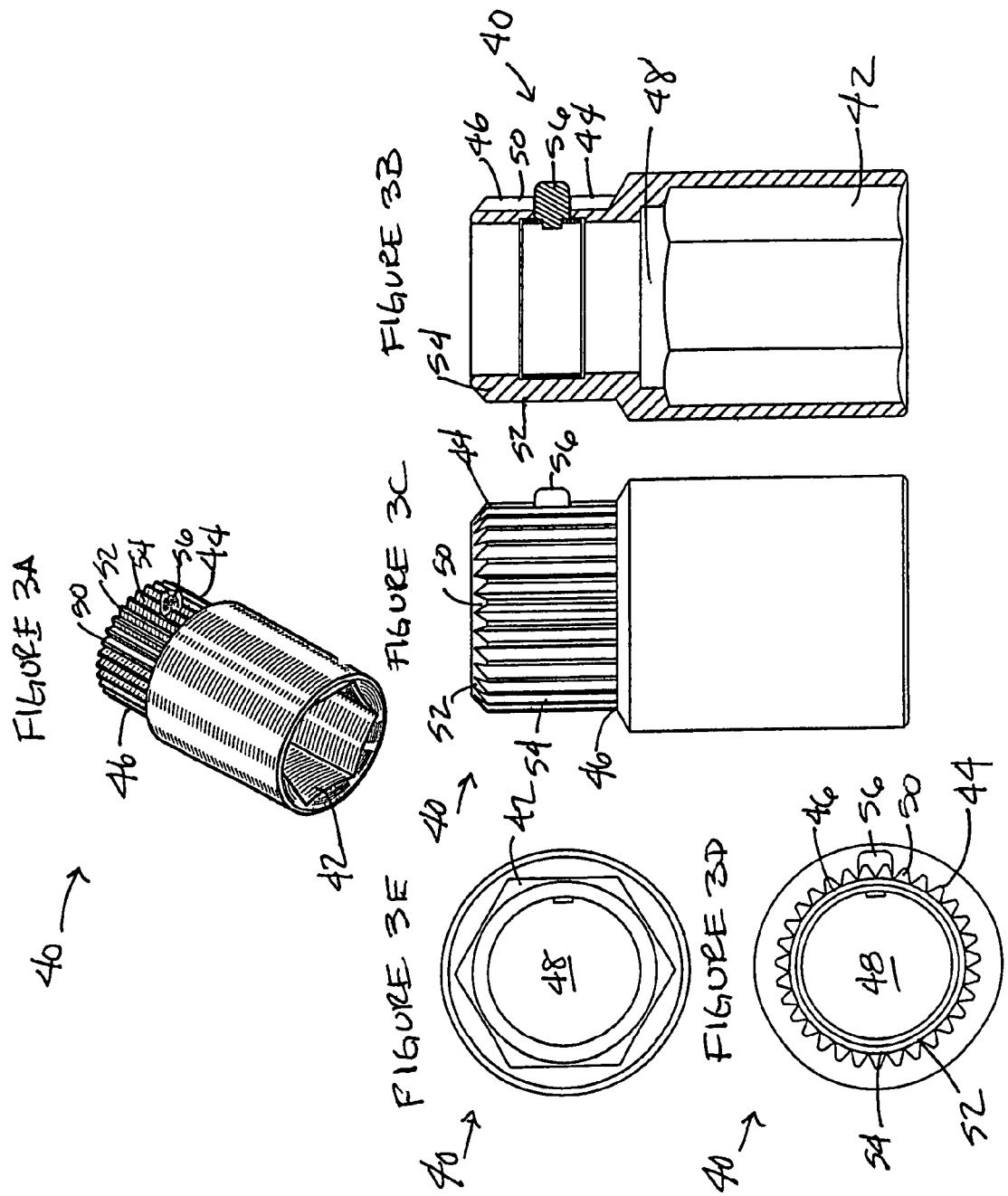

FIGURE 4A
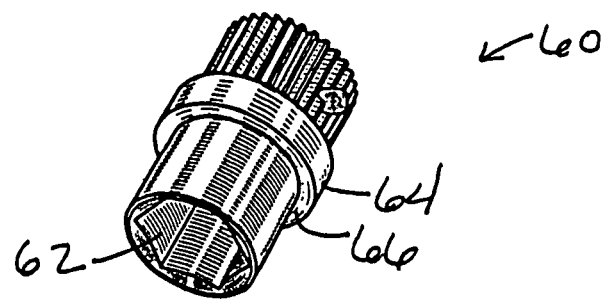
FIGURE 4C           FIGURE 4B
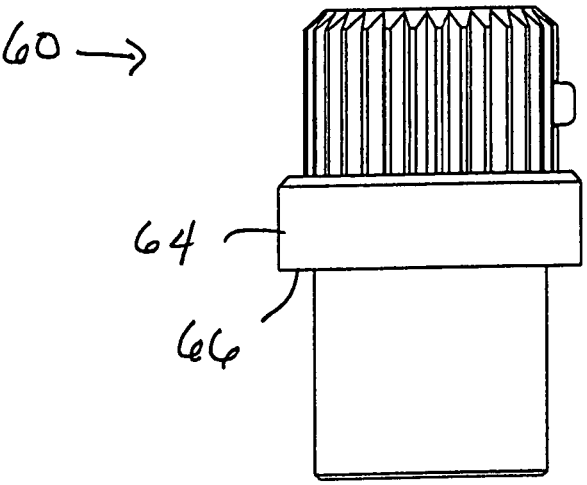  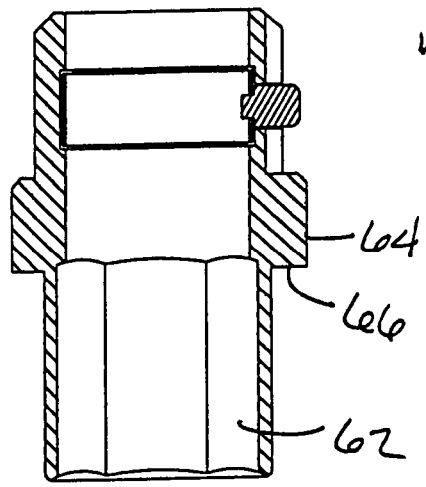

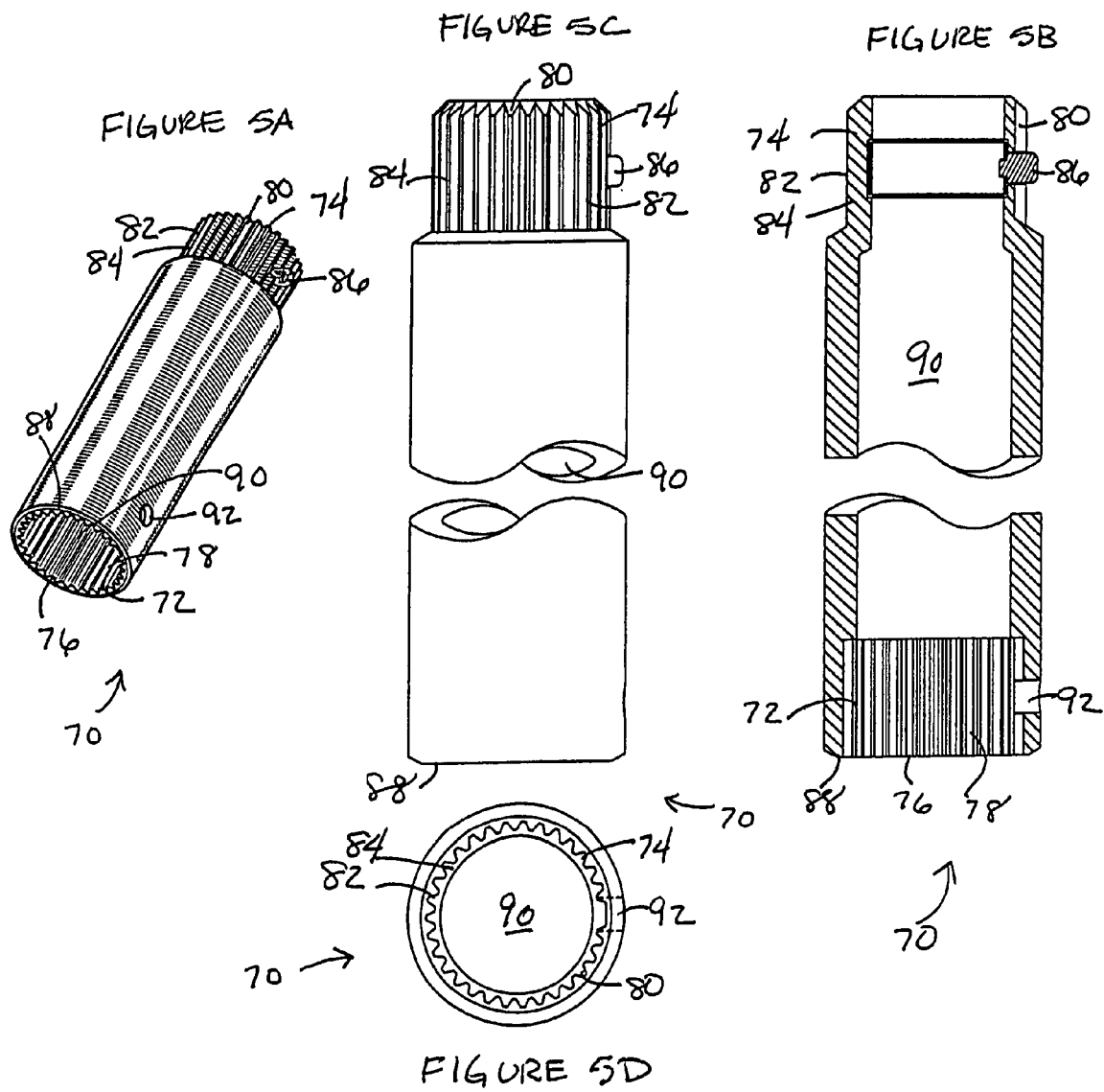

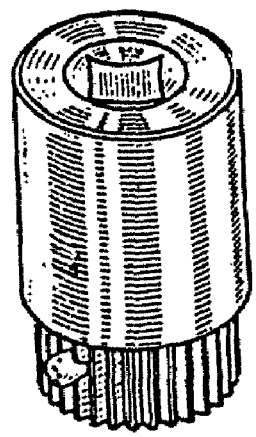
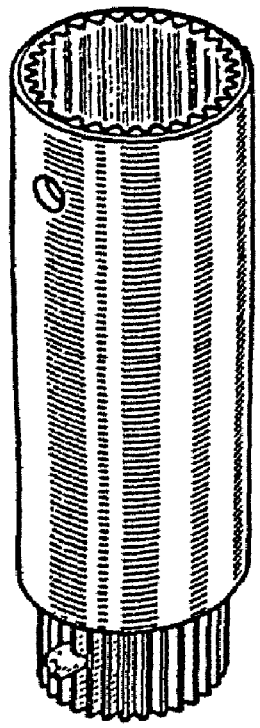
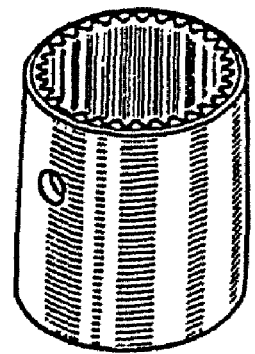
FIG 6

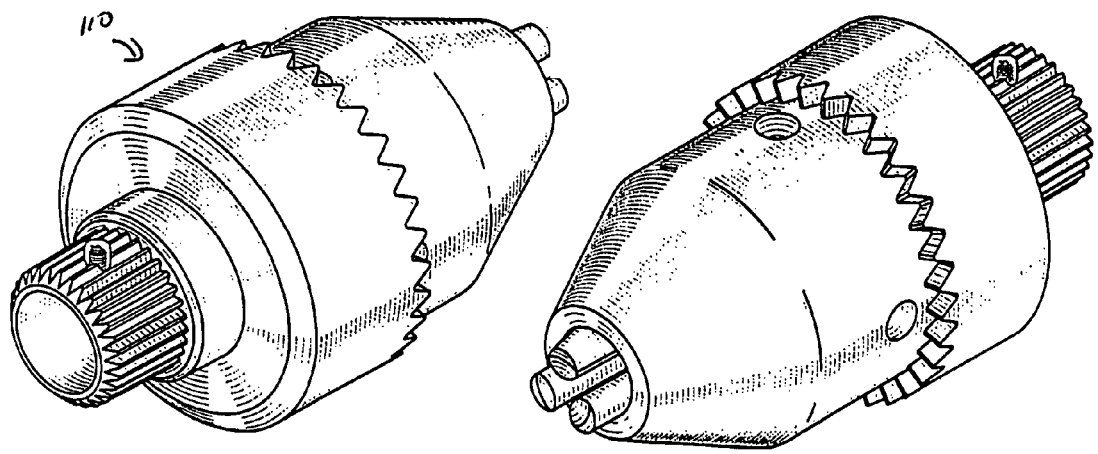
figure 8A          figure 8B
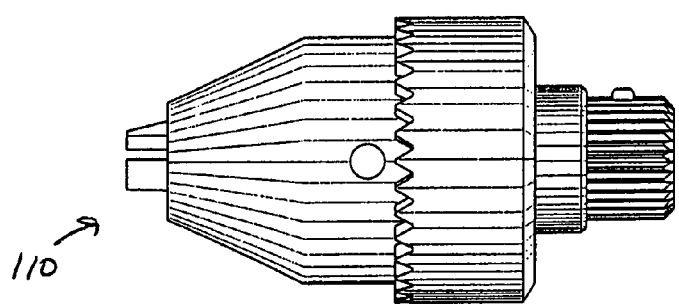
figure 8C
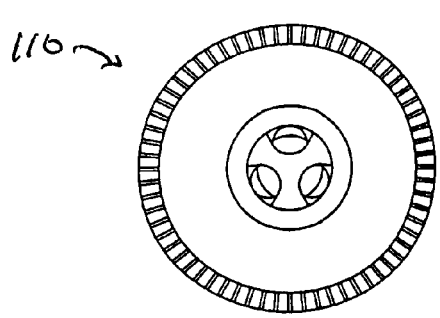    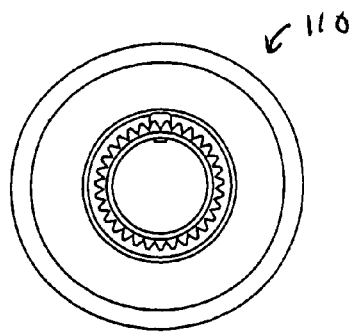
figure 8D          figure 8E

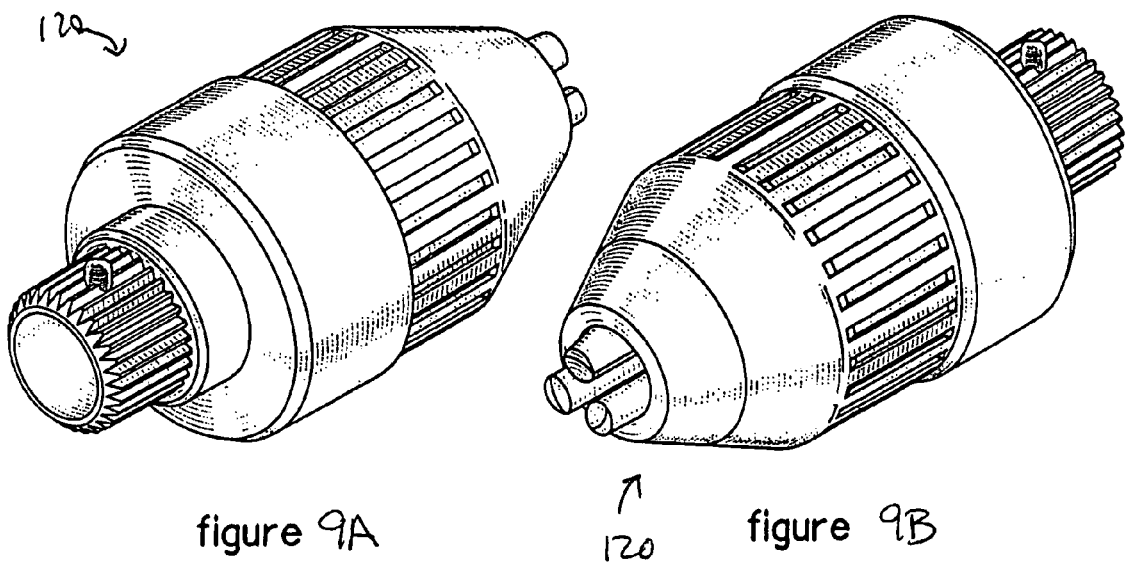
figure 9A    figure 9B
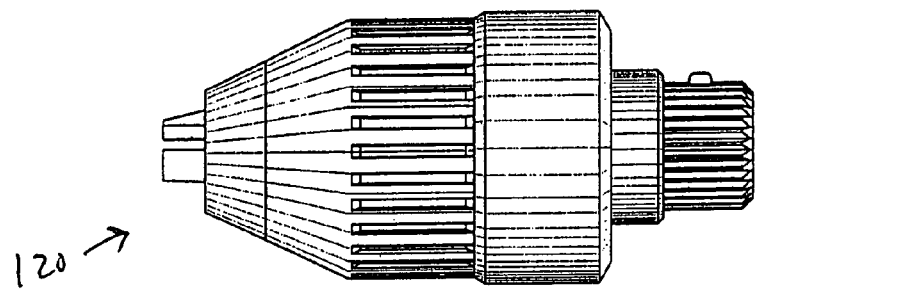
figure 9C
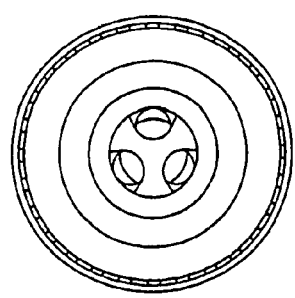 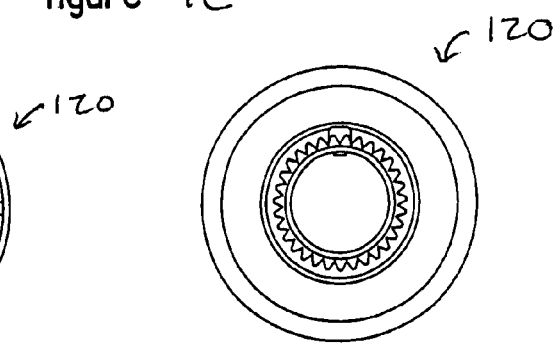
figure 9D    figure 9E

EXTENDABLE SPLINE-DRIVE SOCKET SYSTEM

CROSS REFERENCE TO OTHER APPLICATIONS

This application is a continuation-in-part of Patent Cooperation Treaty application number PCT/US02/21611, filed Jul. 8, 2002, which referenced Ser. No. 29/155,019, filed Feb. 1, 2002; Ser. No. 29/160,447, filed May 9, 2002; Ser. No. 29/160,446, filed May 9, 2002; Ser. No. 29/136,362, filed Jan. 29, 2001; and Ser. No. 09/185,235, filed Nov. 3, 1998.

This application is also a continuation-in-part of U.S. application Ser. No. 29/155,019, filed Feb. 1, 2002 now U.S. Pat. No. D, 476,873, which is a continuation-in-part of U.S. application Ser. No. 29/136,362, filed Jan. 29, 2001, now U.S. Pat. No. D459,961, which is a continuation of U.S. application Ser. No. 09/185,235, filed Nov. 3, 1998, now abandoned.

FIELD OF INVENTION

The present invention relates generally to socket systems. More particularly, it relates to a tool system for use in deep cavities or with long rods. The socket tool has a long internal cavity to allow threaded members to be driven onto a long rod, which may extends into an internal cavity.

BACKGROUND OF THE INVENTION

Socket systems for turning or rotating nuts, bolts, etc. have existed in many forms for many years. These systems typically take the form of a wrench or impact tool having a square drive which interlocks with a socket having a square drive opening. Opposite the drive opening is a hexagonal or 12 pointed opening for a nut or bolt. The drive tool is either manually, pneumatically, or electrically driven to rotate the socket, thereby rotating the nut or bolt the socket is engaging.

These types of systems are only useful in cases where nuts are driven only a short distance onto a rod or for bolts. If a nut is to be driven down a substantial length of rod, the rod begins to interfere with the operation of the driving tool. Deep sockets provide some additional depth into which a rod may feed and provide better access to slightly deeper holes, however, the additional space is minimal, usually only approximately 1 or 2 inches. For the most part, the deep sockets are intended for use in deep openings.

Another tool designed for deep openings is the extension bar. The extension bar is a solid bar that connects a socket to a wrench. However, there is no additional space within the socket or extension bar to allow for a rod or other protrusion. So, although these devices provide better access to nuts and bolt within deep openings, they have no provision for threading a nut any substantial distance onto a threaded rod. Also, with longer devices there may be substantial torque lost due to twisting of the extension bar.

Therefore, there is a need for a tool system that allows the user to turn a nut or other rotational member onto a rod or other protruding member without the rod interfering with the driving mechanism. There is also need of a system that may be used in deep cavities without any substantial loss of torque.

SUMMARY OF THE INVENTION

The present invention takes the form of a multi-piece tool with a standard drive attachment opening. The socket system has at least two pieces: a drive adaptor and a socket. Optionally, one or more extension collars may also be used. When assembled, the socket, extension collar(s) if used, and drive adaptor form a long tubular body having an internal opening into which a rod or other member may enter while the nut is being driven onto the rod. The drive adaptor, extension collars, and sockets preferably attach together using a plurality of interlocking teeth on the inside and outside of the ends of each member. For further stability, a spring biased pin extends from the wall of one member and through a hole in the wall of the mating member. Alternate systems use other attachments, such as a threaded attachment or a drill chuck. Other objects and advantages of the invention will no doubt occur to those skilled in the art upon reading and understanding the following detailed description along with the accompanying drawings.

BRIEF DESCRIPTION OF THE DRAWINGS

FIG. 1 is an exploded perspective view of the socket drive system in use.

FIGS. 2A–E are views of the drive adaptor.

FIGS. 3A–E show views of the socket.

FIGS. 4A–C are views of an alternate socket.

FIGS. 5A–D show views of the extension collar.

FIG. 6 is an exploded perspective view of a socket system with the splines reversed.

FIGS. 8A–E show views of a first chuck attachment.

FIGS. 9A–E show views of a second chuck attachment.

DETAILED DESCRIPTION OF THE INVENTION

Figure 7A:
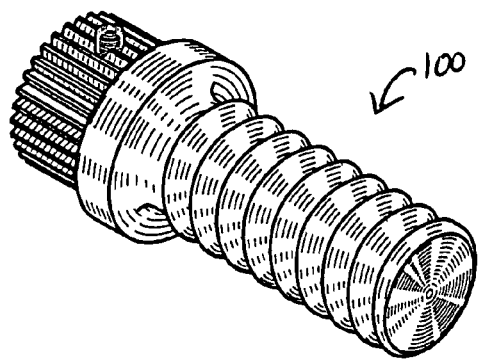
FIGS. 7A–G are views of threaded attachment.

FIG. 1 is an exploded perspective view of the socket system 10 in use driving a nut 12 onto a threaded rod 14. The drive wrench 16 shown is a corded electric version although other versions such as cordless electric, pneumatic, or manual wrenches or ratchet wrenches may also be used. The socket section 18 of the system is made of at least two parts: the drive adaptor 20 and the socket 40. Optionally, one or more extension collars 70 may be used to extend the length of the internal opening 100. FIG. 1 shows a system 10 in which the drive adaptor 20, a single extension collar 70, and the socket 40 are used. The additional length provided by using the drive adaptor 20 and optionally the extension collar(s) 70 allows the user to drive a nut 12 onto a long threaded rod 14. The opening extending through or into each of the sections 20, 40, 70 allows the rod 14 to extend up into the opening while the nut 12 is driven farther down the rod 14. In most cases, the nut is approximately the same size or is smaller than the internal opening, thereby leaving room for the rod to extend into the entire length of the internal opening through the drive adaptor 20, extension collar 70 and socket 40. The diameter of the internal opening may be anywhere in the range of 0.5 inches to 5 inches or more. Typically the larger diameter is used in a situation where the socket 40 is larger and therefore the internal opening needs to be correspondingly larger or where greater torque transmission is required. More preferably, the internal opening has a diameter of 0.75 to 3 inches, most preferably between 1 and 2 inches.

FIGS. 2A and 2B are perspective views of the drive adaptor 20. FIG. 2C is a cross-section thereof, FIG. 2D is a side view, and FIG. 2E is an end view thereof. The drive adaptor 20 shown is a generally cylindrical member having a drive opening 22 at one end and a connector opening 24 at the other end. If preferred, these openings 22, 24 may meet, forming an internal opening 26 through the entire length of the drive adaptor 20. The drive opening 22 may be any desired or functional shape, but is currently shown as an opening 22 for a standard drive such as a ¼", ⅜", or ½" square drive. In order to assist the user in placing the drive opening 22 onto the drive of the drive wrench 16, the drive opening 22 is set in a shallow depression 28, which helps guide the drive to the drive opening 22. The connector opening 24 has a multiplicity of ridges or splines 30 on the interior surface 32 of the wall 34. These ridges 30 interlock with a matching set of ridges or splines 50, 80 on the exterior 52, 82 of the socket 40 or on the extension collar 70. A hole 36 passes through the wall 34 of the connector opening 24 which interlocks with a pin 56, 86 on the socket 40 or on the extension collar 70.

FIG. 3A is a socket end perspective view of the socket 40. FIG. 3B is a cross-section thereof, FIG. 3C is a side view, FIG. 3D an end view, and FIG. 3E is an opposing end view. The socket 40 is a generally cylindrical member having a connector 44 on one end, and a socket opening 42 on the other end. The connector 44 has a multiplicity of ridges or splines 50 that are located on a necked down portion 46 of the connector end of the socket 40. These ridges 50 interlock with ridges 30, 76 in the connector opening 24, 72 in the drive adaptor 20 or in the extension collar 70. A pin 56 extends from the necked down connector portion 46 of the socket 40 and fits into the connector opening 24, 72 of the drive adaptor 20 or the extension collar 70. The pin 56 is spring biased to be in an extended position. When the user wants to release the socket 40 from the drive adaptor 20 or extension collar 70, the pin 56 is depressed and the socket 40 is slid off. Although other shapes and configurations may be used, the socket opening 42 shown is a standard hexagonal socket opening 42. The socket opening 42 extends a portion of the way through the socket 40, at which point it connects to the internal opening 48 that extends through the remainder of the socket 40.

FIG. 4A is a socket end perspective view of an alternate socket 60. FIG. 4B is a cross-section thereof and FIG. 4C is a side view of the alternate socket. In this embodiment, the socket opening 62 is smaller, and the diameter of the socket opening 62 end of the socket 60 has been reduced to conserve material and allow the tool to be functional in smaller openings. A thicker ring 64 is located around the socket 60 to prevent the extension collar 70 or drive adaptor 20 from extending too far onto the socket 60. The end wall 38, 88 of the connector opening 24, 72 of the drive adaptor 20 or the extension collar 70 abuts the edge 66 of the ring 64 and is prevented from progressing any farther onto the socket 60.

FIG. 5A is a perspective view of the extension collar 70. FIG. 5B is a cross-section thereof. FIG. 5C is a side view and FIG. 5D is an end view of the extension collar 70. The extension collar 70 is a generally cylindrical member, which fits between the drive adaptor 20 and the socket 40 when a longer internal opening 100 is desired, or when the opening into which the socket system 10 is being used is deeper. The internal opening 90 of the extension collar 70 extends through the entire length of the collar 70 and connects to the internal opening 48 in the socket 40. When attached to the drive adaptor 20, the internal opening 90 ends at the base 39 of the connector opening 24 in the drive adaptor 20. The extension collar 70 may be any suitable length, such as from one to twenty inches in length, more preferably between two and fifteen inches in length, most preferably between three and ten inches in length.

Alternate embodiments may have a deeper section extending from the connector opening 24 in the drive adaptor 20 to provide further depth for the internal opening 100. In other designs, the internal opening 100 may connect to the drive opening 22 so that the internal opening 100 passes through the entire length of the socket section 18.

When in use, the user may choose to use the pieces of the multi-piece socket section 18 in different configurations depending on the application. For example, if a standard socket is too shallow, but only by a small amount, the socket 40, 60 may be connected directly to a drive adaptor 20. This is applicable in cases where the socket 40, 60 of the present invention has a greater length than a standard socket. If a greater depth is required, the socket 40, 60 may be attached to an extension collar 70 which is then attached to the drive adaptor 20. If the length necessary is greater still, one or more additional extension collars 70 may be inserted between the socket 40, 60 and the drive adaptor 20 until the length is sufficient for the application.

The number of ridges or splines 30, 50, 76, 80 may be anywhere between ten and a hundred, with a smaller number typically used for smaller diameter drives and a larger number used for large diameter drives. More preferably, between fifteen and fifty ridges 30, 50, 76, 80 are used. Most preferably, between twenty and forty ridges 30, 50, 76, 80 are used. In the embodiments shown, there are thirty-two ridges 30, 50, 76, 80 which provide the rotational connection between the drive adaptor 20, socket 40, 60, and extension collar(s) 70. With larger numbers of ridges 30, 50, 76, 80, the user must be more careful to properly align the pins 56, 86 and holes 36, 92 such that each pin 56, 86 properly aligns and extends through the corresponding hole 36, 92. However, a larger number of ridges 30, 50, 76, 80 increases the gripping surface between the drive adaptor 20, socket 40, 60, and extension collar 70, as well as increasing the maximum possible size of internal opening 100, thereby allowing a larger rod to fit within the internal opening 100.

A further benefit of the present design is the increased moment of inertia, which is created by using a collar type of design instead of the narrower rods found in the extension bars of the prior art. The increased moment of inertia is created by placing the material farther away from the center of rotation in a collar formation instead of a rod that is focused around the centerpoint. Force transmission is also improved by placing the splines on the exterior surface of one collar and the interior surface of a slight larger collar. These design features create a system in which the torque transmission is less likely to damage the parts of the socket drive system 10, while providing greater torque transmission.

Alternate connections may be formed between the pieces of the socket section 18. For example, the embodiments shown have the female portions of the connections on the socket 40 end of the members, and the male portions on the wrench 16 end of the members. These may be reversed if desired, as shown in FIG. 6.

Figure 7B:
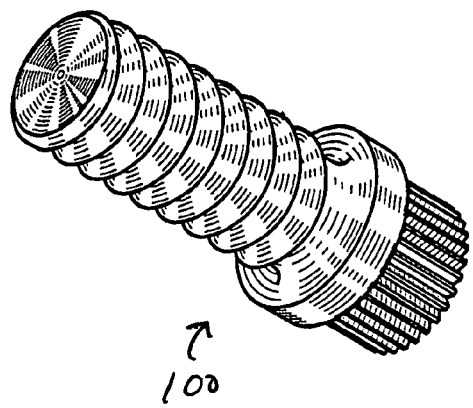
Figure 7C:
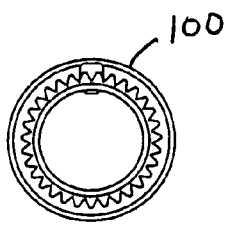
Figure 7D:
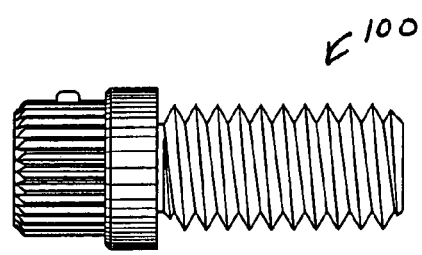
Figure 7E:
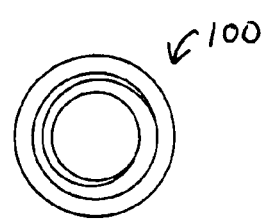
Figure 7F:
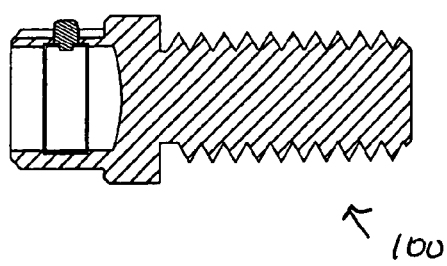
Figure 7G:
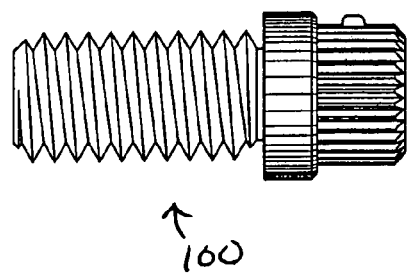

Additional attachments may also be included in the socket system or they may be additional separate attachments. Examples of the additional attachments include a threaded attachment 100, as seen in FIGS. 7A–G. FIG. 7A is a top perspective view, FIG. 7B is a bottom perspective view, FIG. 7C is a back end view, FIG. 7D is a right side view, FIG. 7E is a front end view, FIG. 7F is a cross-sectional view, FIG. 7G is a left side view and. The threaded attachment 100 may have any suitable diameter, such as from 0.1 to 2 inches, more preferably between 0.25 to 1 inch. The length of the attachment 100 is approximately in the range of 0.25 and 5 inches, more preferably between 0.5 inches and 3 inches, and most preferably between 0.5 and 1.5 inches. The threaded attachment 100 is used to connect threaded tools, such as core bits, sanding or grinding wheels or other tools with a female threaded attachment opening. The diameter and length of the threaded attachment 100 used is determined by the opening in the tool to be attached to the threaded attachment 100.

FIG. 8A is a top perspective view of a first chuck attachment 110, FIG. 8B is a bottom perspective view, FIG. 8C is a left side view, FIG. 8D is a front end view and FIG. 8E is a back end view thereof. FIG. 9A is a top perspective view of a second chuck attachment 120, FIG. 9B is a bottom perspective view, FIG. 9C is a left side view, FIG. 9D is a front end view and FIG. 9E is a back end view thereof. The chuck attachments 110, 120 allow a user to use standard or specialty drill bits with the system, thereby making it possible to drill a hole within a deep opening or other hard to reach location.

Another option would be an angled drive. In this case the user would be able to use any of the sockets or other attachments, but the drive mechanism would have a fixed or adjustable angle built-in one of the sections. Although other fixed angles may be used, a typical configuration would have the socket or drill acting at a right angle to the longitudinal axis of the drill's rotation. The angle may be achieved by a special extension collar with a fixed or adjustable angle mechanical interface or within a special attachment such as a socket, drill chuck or other attachment wit the angle incorporated therein.

Although a generally cylindrical socket section 18 is optimal for providing the maximum internal opening 100 for the least rotational footprint, other shapes of socket sections 18 may also be used, such as square, hexagonal, and other geometric and nongeometric shapes may be used. A further variation could use one or more keys that fit in corresponding keyways. The keyways could be straight with a locking pin, or the keyways could be a labyrinth forming an interlock with a key, with or without spring biasing. Locking rings, and other types of interlocks may be substituted for the hole and pin and/or the interlocking ridges.

Many features have been listed with particular configurations, options, and embodiments. Any one or more of the features described may be added to or combined with any of the other embodiments or other standard devices to create alternate combinations and embodiments.

Although the examples given include many specificities, they are intended as illustrative of only one possible embodiment of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

I claim:

1. A socket system, comprising:
    a socket having a socket opening extending into said socket from a first end, a second opening extending from said socket opening through said socket to a second end thereof, a first multiplicity of ridges located around a surface of said socket,
    and an extension collar having a first end and a second end, a second multiplicity of ridges located on said first end, said second multiplicity of ridges sized and configured to mate with said first multiplicity of ridges on said socket, an opening extending through said extension collar, said extension collar having a length greater than a length of said socket, said length of said extension collar being formed of a single tubular body.

2. The socket system of claim 1, wherein said first multiplicity of ridges is located on an outside surface of said socket and said second multiplicity of ridges is located on an inside surface of said extension collar.

3. The socket system of claim 1, further comprising a third multiplicity of ridges located around a surface of said extension collar, and a fourth multiplicity of ridges located around a surface of a driver, said fourth multiplicity of ridges sized and configured to mate with said third multiplicity of ridges.

4. The socket system of claim 3, wherein said third multiplicity of ridges is located on an outside surface of said socket and said fourth multiplicity of ridges is located on an inside surface of said driver.

5. The socket system of claim 3, wherein said driver is chosen from the group of drivers consisting of: electric drive wrench, pneumatic drive wrench, manual wrench and ratchet wrench.

6. The socket system of claim 1, further comprising a drive adaptor having a first end, a second end, a first opening extending into said drive adaptor from said first end, said first opening aligning with said opening through said extension collar, when said drive adaptor and said extension collar are connected, a drive opening extending into said drive adaptor from said second end.

7. The socket system of claim 1, further comprising connector means for detachably attaching said socket and said extension.

8. The socket system of claim 7, wherein the connector means is chosen from the group of connectors consisting of: spring-biased pin, keyway, interlocking ridges and locking rings.

9. The socket system of claim 1, wherein said opening in said extension collar is larger in diameter than said socket opening.

10. The socket system of claim 1, wherein said extension collar is at least two inches in length.

11. The socket system of claim 1, wherein said extension collar is at least three inches in length.

12. The socket system of claim 1, wherein said first and second multiplicities of ridges each contain between twenty and forty ridges.

13. The socket system of claim 1, wherein said first and second multiplicities of ridges each contain 32 ridges.

14. The socket system of claim 1, wherein said second multiplicity of ridges has a ridge length, said ridge length being less than half said length of said extension collar.

15. A tool kit, comprising:
    a plurality of tool attachments, each attachment having a first multiplicity of ridges located around a surface thereof,
    and an extension collar having a first end and a second end, a second multiplicity of ridges located on said first end, said second multiplicity of ridges sized and configured to mate with said first multiplicity of ridges on each of said tool attachments, an opening extending through said extension collar, said extension collar having a length greater than a length of said tool attachment, said length of said extension collar being formed of a single tubular body.

16. The tool kit of claim 15, wherein said plurality of tool attachments includes a socket, a threaded rod and a chuck.

17. The tool kit of claim 15, wherein said plurality of tool attachments includes at least one socket, said socket having a socket opening extending into said socket from a first end, a second opening extending from said socket opening through said socket to a second end thereof, said first multiplicity of ridges located around a surface of said socket.

18. A socket system, comprising:
a socket having a socket opening extending into said socket from a first end, a second opening extending from said socket opening through said socket to a second end thereof, a first multiplicity of ridges located around a surface of said socket,
an extension collar having a length, a first end and a second end, a second multiplicity of ridges located on said first end, said second multiplicity of ridges sized and configured to mate with said first multiplicity of ridges on said socket, an opening extending through said extension collar, said extension collar having a length greater than a length of said socket, said length of said extension collar being formed of a single tubular body having a length of at least two inches, a third multiplicity of ridges located around a surface of said extension collar,
and a driver having a fourth multiplicity of ridges located around a surface of said driver.

19. The socket system of claim 18, wherein said driver is chosen from the group of drivers consisting of: electric drive wrench, pneumatic drive wrench, manual wrench and ratchet wrench.

20. The socket system of claim 18, wherein said second multiplicity of ridges has a length less than half said length of said extension collar, and said third multiplicity of ridges has a length less than half said length of said extension collar.

* * * * *